(12) United States Patent
Yalamanchili et al.

(10) Patent No.: US 10,206,072 B1
(45) Date of Patent: Feb. 12, 2019

(54) INLINE MESSAGING

(71) Applicant: T-Mobile USA, Inc., Bellevue, WA (US)

(72) Inventors: Kalyan Yalamanchili, Kirkland, WA (US); Xavier Ligeret, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/674,484

(22) Filed: Aug. 10, 2017

(51) Int. Cl.
*H04W 4/14* (2009.01)
*H04L 12/58* (2006.01)
*H04L 29/06* (2006.01)

(52) U.S. Cl.
CPC .............. *H04W 4/14* (2013.01); *H04L 51/16* (2013.01); *H04L 65/1006* (2013.01); *H04L 65/1016* (2013.01)

(58) Field of Classification Search
CPC ...... H04W 4/14; H04L 51/16; H04L 65/1016; H04L 65/1006
See application file for complete search history.

(56) References Cited

U.S. PATENT DOCUMENTS

| | | |
|---|---|---|
| 2006/0206566 A1 | 9/2006 | Kelley et al. |
| 2012/0079033 A1 | 3/2012 | Vuong |
| 2012/0198017 A1* | 8/2012 | LeVasseur ............. H04L 51/24 709/206 |
| 2012/0225652 A1* | 9/2012 | Martinez ........... H04M 3/42374 455/435.1 |
| 2014/0068635 A1* | 3/2014 | Holzleitner ............. G06F 9/546 719/314 |
| 2014/0310365 A1 | 10/2014 | Sample et al. |
| 2015/0281143 A1 | 10/2015 | Wang |
| 2015/0288633 A1* | 10/2015 | Ogundokun ............ H04L 51/12 709/206 |
| 2016/0188555 A1 | 6/2016 | Moon |

OTHER PUBLICATIONS

International Searching Authority, International Search Report and Written Opinion, PCT Patent Application No. PCT/US2018/046369, dated Nov. 28, 2018, 12 pages.

* cited by examiner

*Primary Examiner* — Khai M Nguyen
(74) *Attorney, Agent, or Firm* — Perkins Coie LLP

(57) ABSTRACT

The disclosed system provides an inline messaging capability for multiple participants in a messaging thread. The disclosed system allows a participant in a thread to insert an inline message, which is a message that appears between any two previously received messages selected by the participant (rather than limiting the participant to inserting a new message at the end of the messaging thread). The disclosed system assigns a hierarchical sequence number to each message that enables the system to display messages in a messaging thread in a desired order. The disclosed system also enables the addition of one or more new participants to an existing messaging thread with delivery of previous messages in the thread to the newly added participant or participants.

20 Claims, 7 Drawing Sheets

INLINE MESSAGING

BACKGROUND

In traditional messaging systems, a new message from a participant in a messaging thread appears at the bottom of the thread, underneath previously received messages. While such systems may be adequate for discussions that proceed in a linear fashion, such systems are inconvenient in cases where a participant desires to respond to a message that appears earlier in a message thread instead of responding to the last message received. For example, if a participant forgets to respond to an earlier question or has a desire to supplement a previous answer, traditional systems would require the participant to answer the forgotten question or to supplement previous information by entering a message at the bottom of the message thread, potentially requiring the participant and other participants in the thread to repeatedly scroll up and down a display screen to reference the new information. The need to scroll back and forth between recent and previous messages is frustrating to participants in a messaging thread, inefficient, confusing, and generally harmful to the user experience. These and other problems exist with traditional messaging systems.

DETAILED DESCRIPTION

Figure 1:
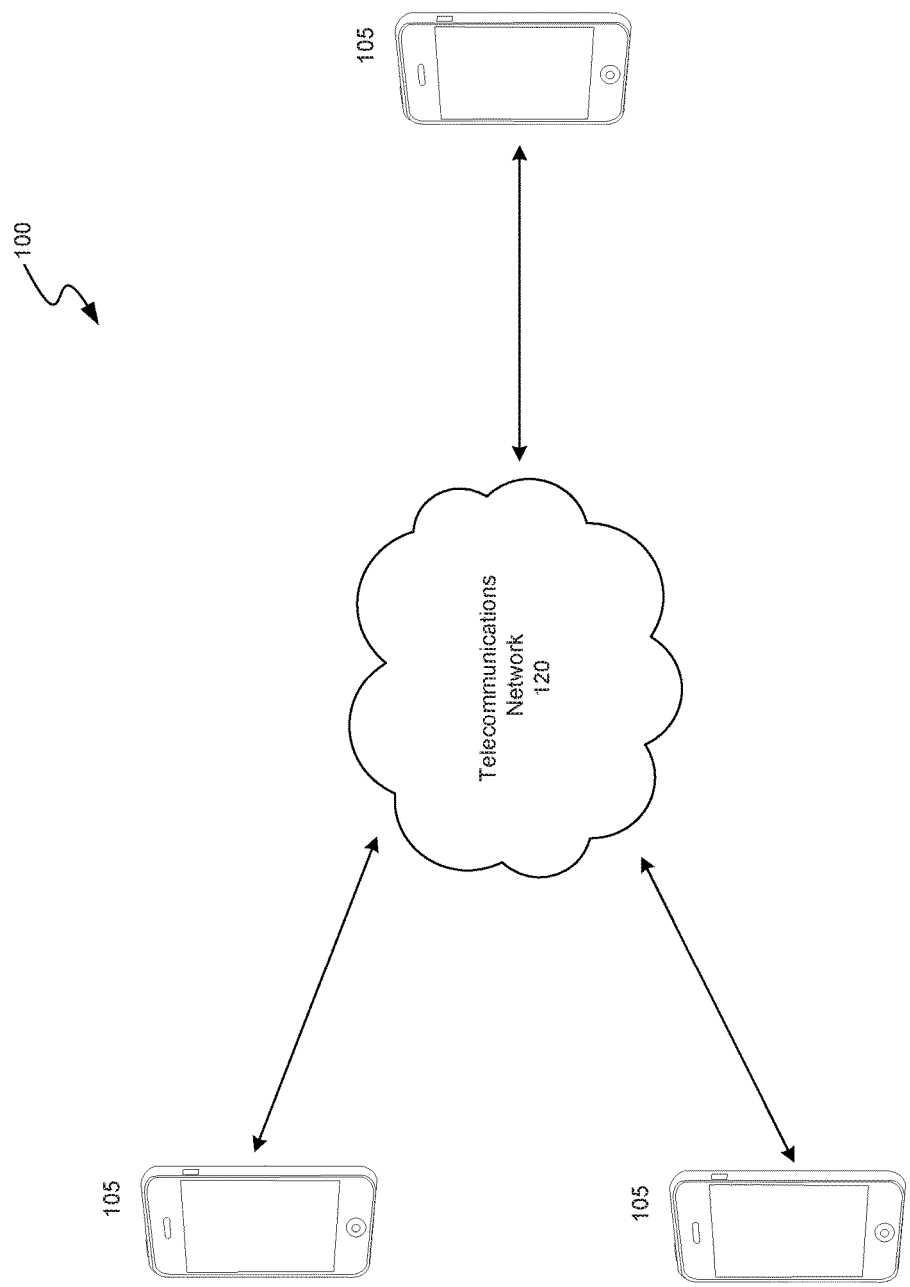
FIG. 1 is a diagram of a representative environment in which an inline messaging system may operate.

The disclosed system provides an inline messaging capability for multiple participants in a messaging thread. A messaging thread is a collection of messages (e.g., text messages, Short Message Service (SMS) messages, Multimedia Messaging Service (MMS) messages, which are herein referred to collectively as "messages") that are exchanged between two or more participants (or "users"). For example, the disclosed system may operate with a first messaging thread having participants A, B, and C; a second messaging thread having participants D and E; a third messaging thread having participants B, F, and G; and so on. The disclosed system allows a participant in a messaging thread to insert an inline message, which is a message that appears between any two previously received messages selected by a participant (rather than limiting the participant to inserting a new message at the end of the messaging thread). As explained in more detail below, the disclosed system assigns a sequence number to each message that enables the system to display messages in a message thread in a desired order. The system uses hierarchical sequence numbers, such a sequence and subsequence numbers in a parent/child relationship, to enable the display of inline messages that appear between two previously selected messages appearing earlier in the thread. In some embodiments, the system uses date and/or timestamps to alternatively display messages in chronological order. In such embodiments, the disclosed system enables a user of the messaging system to display messages in sequential order for inline messaging, or in chronological order such that messages are not displayed inline. The disclosed system also enables the addition of one or more new participants in an existing messaging thread. In some embodiments, a newly added participant receives some or all of the previous messages in the thread.

The disclosed system is adapted to operate in various types of telecommunications and data networks, including second-generation wireless telephone technology (2G) networks, third-generation wireless telephone technology (3G) networks, fourth-generation wireless telephone technology (4G) networks, long-term evolution (LTE) networks, Local Access Networks (LAN), Wireless LANs (WLAN), Global System for Mobile Communications (GSM) networks, Bluetooth, WiFi, Fixed Wireless Data networks. The disclosed system is compatible with a variety of networks but is suited in particular for IMS networks. The disclosed system is adapted to comply fully with Session Initiation Protocol (SIP) and 3GPP standards, including 3GPP TS 23.218 (IP Multimedia session handling; IM call model; Stage 2), RFC 7976 ((2016): Updates to Private Header (P-Header) Extension Usage in Session Initiation Protocol (SIP) Requests and Responses), RFC 4975 (Message Session Relay Protocol), and RFC for SIP standards including for example RFC 3261 (SIP: Session Initiation Protocol), all of which are hereby incorporated by reference herein in their entirety.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment in which an inline messaging system may operate. In the environment 100, participant mobile devices 105 exchange one or more messages among each other via telecommunications network 120. Telecommunications network 120 may be any telecommunications network capable of facilitating the transfer of messages between multiple mobile devices, including for example an Internet Protocol Multimedia Subsystem (IMS) network. Mobile devices 105 may include virtually any devices for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile devices 105 typically include a processing unit, volatile memory and/or nonvolatile memory, a power supply, one or more network interfaces, an audio interface, a display, a keypad or keyboard and other input and/or output interfaces. The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications.

Mobile devices 105 may connect to a telecommunications network via a trusted radio access network (RAN) or an untrusted RAN (not shown). A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 2:
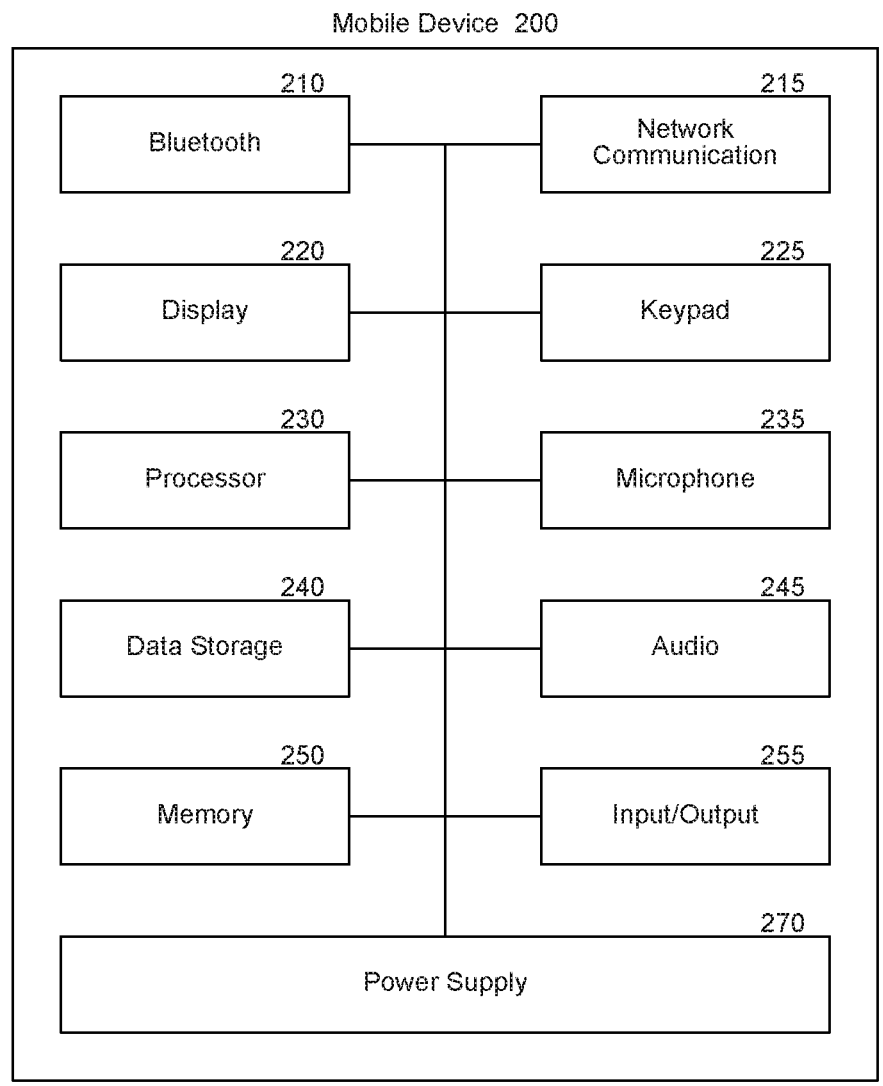
FIG. 2 is a block diagram of a representative mobile device 105 that may exchange messages in a messaging session in accordance with embodiments herein.

FIG. 2 is a block diagram of a representative mobile device 105 that may send and receive inline messages in accordance with embodiments herein. Each mobile device 105 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Figure 3A:
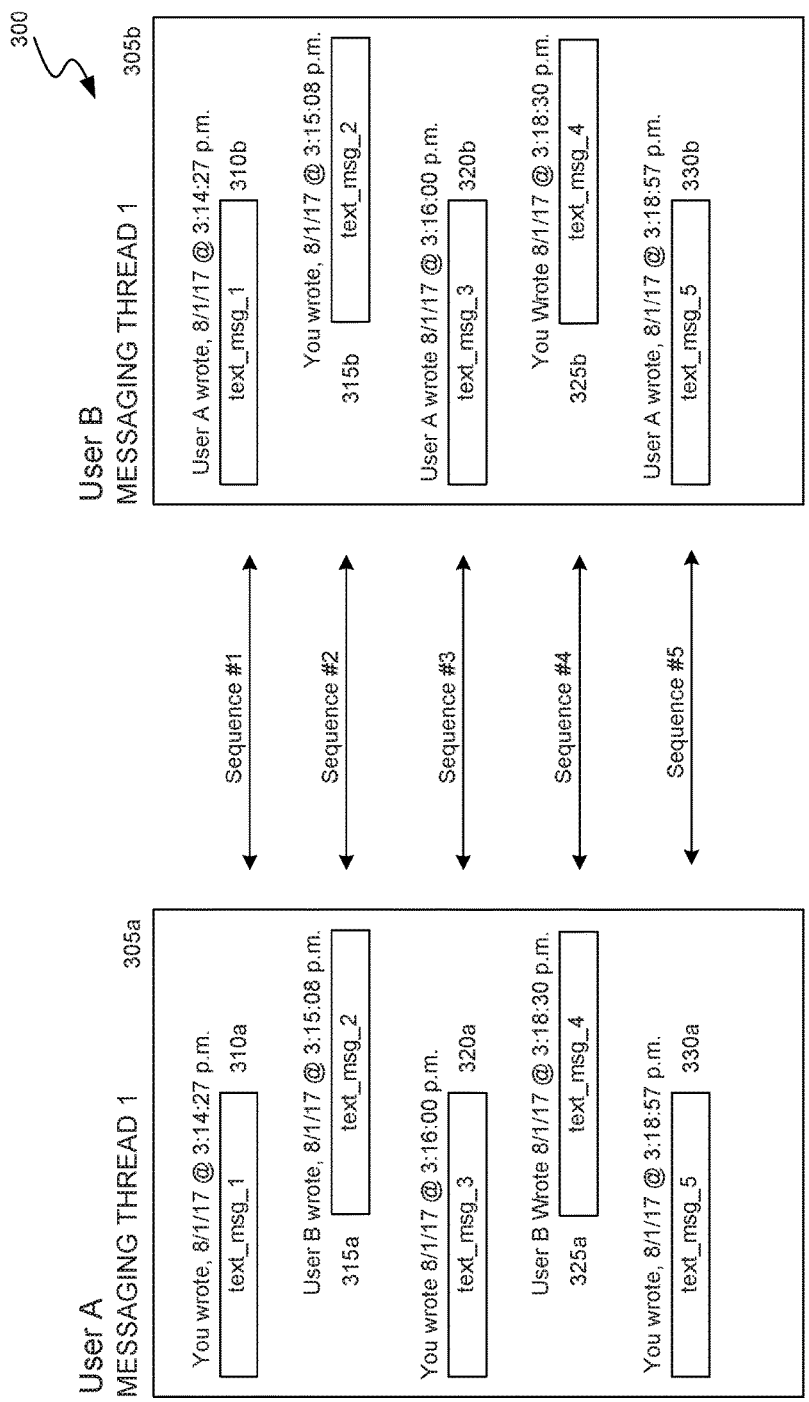
FIG. 3A depicts a first display 305a for a first participant ("User A") and a second display 305b for a second participant ("User B") in a messaging thread.

FIG. 3A depicts a first display 305a for a first participant ("User A") and a second display 305b for a second participant ("User B") in a messaging thread. As depicted in FIG. 3A, each message in a messaging thread is assigned a unique sequence number. A messaging client installed on each participant's mobile device assigns a sequence number to a new message before it is transmitted to other participants in the messaging thread. The messaging client, upon sending or receiving a new message, uses the sequence number to determine the order in which the message is displayed on the display of the mobile device. In the disclosed system, sequence numbers are hierarchical, such that a first message in a messaging thread is assigned a top-level (or parent) sequence, and the sequence number is incremented each time that a new message is received in the sequence. Each time a participant sends a new inline message, the disclosed system assigns the new inline message a new subsequence number, and the subsequence number is incremented each time that a new message is received in that subsequence. Any number of subsequences may be created and/or nested in the disclosed system to provide for flexible inline messaging. By assigning each message a sequence number or subsequence number, the disclosed system is able to reorder messages for display in the correct order to multiple participants in a messaging thread. The disclosed system allows one or more participants to delete a message after the message has been sent. In such circumstances, the system does not reassign the sequence number of the deleted message. The example of FIG. 3A depicts five sequences in a messaging thread between User A and User B prior to an inline message being sent:

Sequence #1 (310a and 310b): User A sends a first text message ("text_msg_1") to User B on Aug. 1, 2017, at 3:14:27 p.m.

Sequence #2 (315a and 315b): User B sends a second text message ("text_msg_2") to User A on Aug. 1, 2017, at 3:15:08 p.m.

Sequence #3 (320a and 320b): User A sends a third text message ("text_msg_3") to User B on Aug. 1, 2017, at 3:16:00 p.m.

Sequence #4 (325a and 325b): User B sends a fourth text message ("text_msg_4") User A on Aug. 1, 2017, at 3:18:30 p.m.

Sequence #5 (330a and 330b): User A sends a fifth text message ("text_msg_5") to User B on Aug. 1, 2017, at 3:18:57 p.m.

Figure 3B:
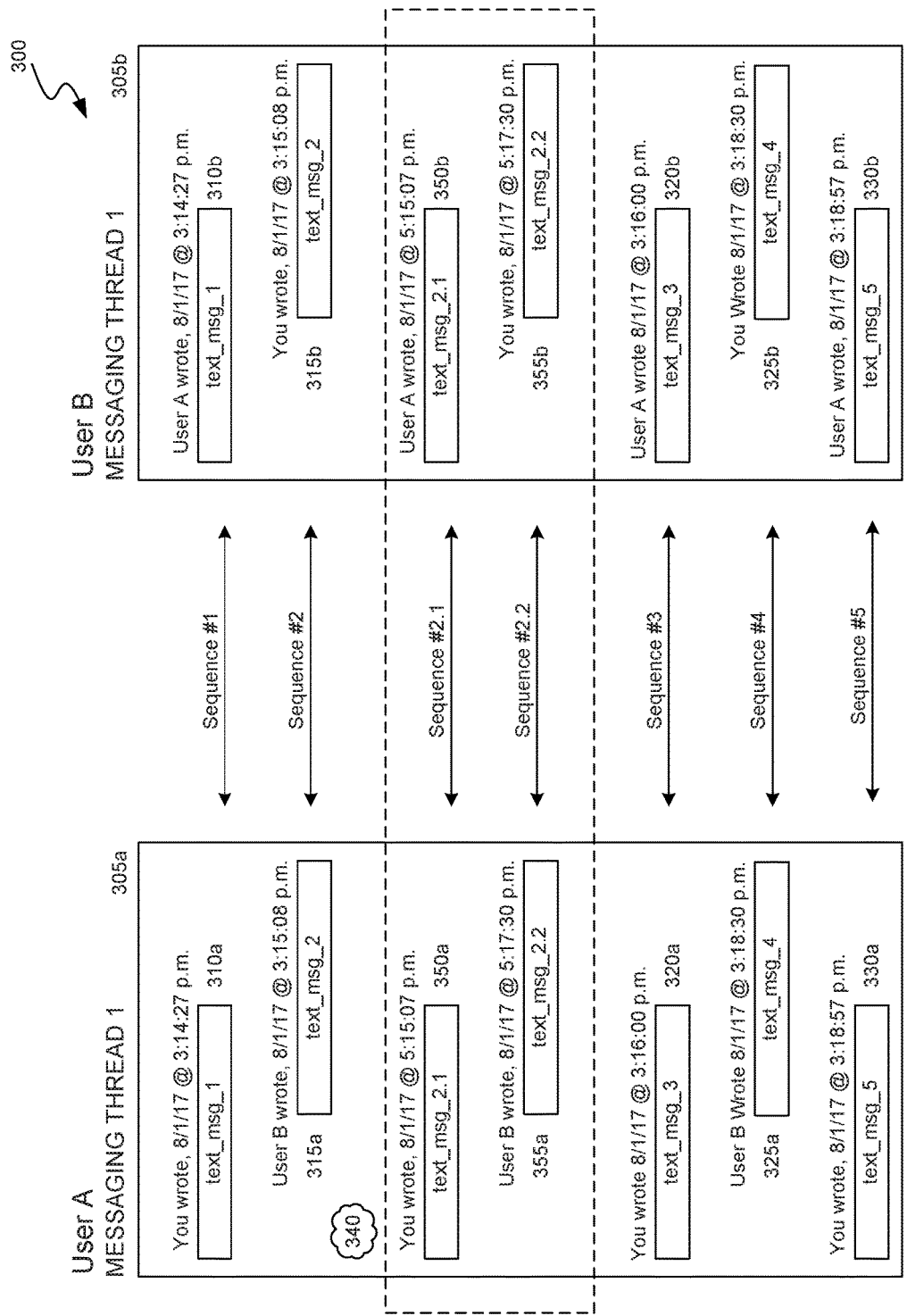
FIG. 3B depicts the first display 305a and the second display 305b with inline messages.

FIG. 3B depicts the first display 305a and the second display 305b with inline messages. Indicator 340 represents an area that User A selects on display 305a to indicate a desire to insert an inline message between text_msg_2 and text_msg_3. After selecting area 340, User A enters a new message between text_msg_2 and text_msg_3, thereby creating a new subsequence. User B may respond to the new inline message, which causes the system to increment the subsequence number associated with the response message. In particular, FIG. 3B depicts two subsequences corresponding to inline messages sent between User A and User B:

Subsequence #2.1 (350a and 350b): User A sends a sixth text message ("text_msg_2.1") to User B on Aug. 1, 2017, at 5:15:07 p.m.

Subsequence #2.2 (355a and 355b): User B sends a seventh text message ("text_msg_2.2") to User A on Aug. 1, 2017, at 5:11:30 p.m.

In some embodiments, a new message created by a user will default to a sequence or subsequence number at the same hierarchical level of the previously received message unless the user indicates a different hierarchical level. In other embodiments, a new message created by a user will by default appear at the bottom of the messaging thread unless the user indicates a desire to send the message as an inline message between two previously received messages. In some embodiments, when a new inline message is received, the user interface draws attention to the newly received message by, for example, displaying the inline message in a different color or font than previously received message and/or scrolling to the newly received inline message after it has been received. The system may provide a haptic feedback or play a sound unique to an inline message. In some embodiments, a user may configure the user interface to toggle between displaying the thread chronologically (regardless of the inline messaging) and displaying messages inline (according to sequence or subsequence number).

Figure 4:
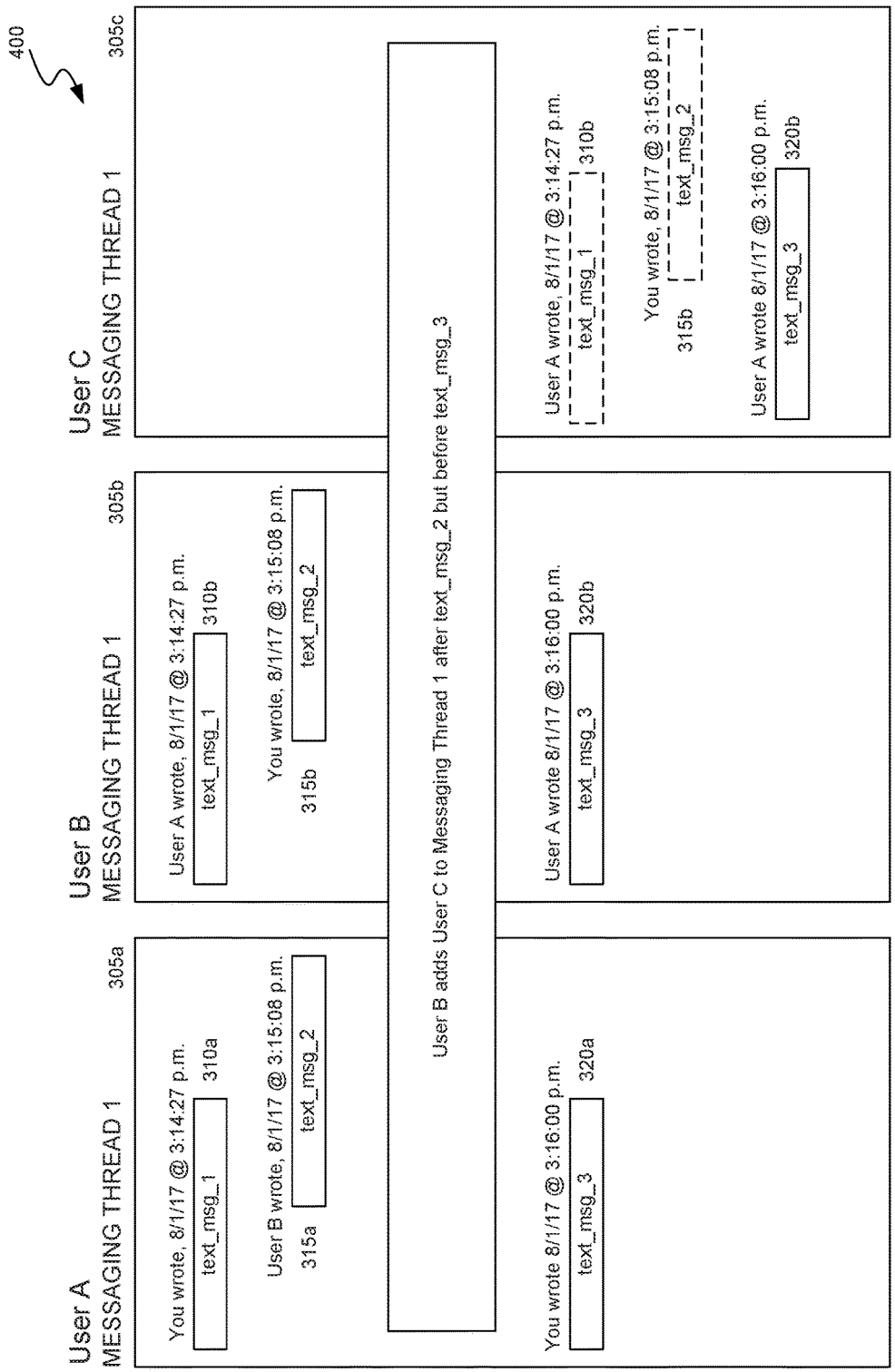
FIG. 4 depicts a messaging thread in which a new participant is added to an existing messaging thread.

In some embodiments, the disclosed system allows one or more new participants to be added to an existing message thread. In such embodiments, the disclosed system is capable of sending previous messages in the thread to the new participant(s), including inline messages. FIG. 4 depicts a messaging thread in which a new participant is added to an existing messaging thread. In particular, FIG. 4 depicts the first display 305a for User A, the second display 305b for User B, and a third display 305c for a third participant ("User B") who is added to the messaging thread after messages have already been exchanged between User A and User B. As depicted, text_msg_1 and text_msg_2 are exchanged between User A and User B prior to User C joining the thread. When User C joins the thread, User C automatically receives a copy of text_msg_1 and text_msg_2 even though both messages were exchanged before User C joined the thread. Because text_msg_3 is sent after User C has joined, all three recipients receive text_msg_3 simultaneously. The disclosed system may be configured such that a participant who is added to an existing message thread receives all previous messages in the thread, receives a fixed number of previous messages in the thread, or receives all previous messages within a certain timeframe in the thread. The extent to which previous messages are received by the newly added participant may be configured by a telecommunications provider and/or by individual users.

To accomplish inline messaging in an IMS network, the disclosed system creates a "P-Inline-Message" header that is appended to an SIP INVITE or MESSAGE request method. INVITE may be used for session-oriented messaging ("Session Mode Messaging"), while MESSAGE may be used for sessionless messaging ("Pager Mode Messaging"). The P-Inline-Message header comprises a unique message thread ID (UMTID) and a unique message sequence ID (UMSID) within a message thread. The UMTID is a unique number that is used to accurately identify a thread. In one embodiment, the UMTID is the sending participant's unique identification number (e.g., Mobile Station International Subscriber Directory Number (MSISDN), full International Mobile Subscriber Identity (IMSI), or International Mobile Equipment Identity (IMEI)) and the date and time up to the millisecond. The UMSID is a unique number within a particular messaging thread, although two different messaging threads can use the same UMSIDs respectively. In some embodiments, the UMSID is incremented (e.g., incremented by a value of 1) for every new message at the same hierarchical level. On the sending participant's side, a new message that is created between two existing messages of the same hierarchical level is considered one level lower in the hierarchy, and the UMSID will add a subsequence (e.g., 2.1). On the receiving participant's side, the UMSID is used to insert the new message within the hierarchical tree. In some embodiments, P-Inline-Message header also includes a list of previous text messages possibly up to the parent message or first message in the thread. In some embodiments, each of the messages contains a timestamp, UMSID, sending participant's phone number (or MSISDN), and the message itself.

Figure 5:
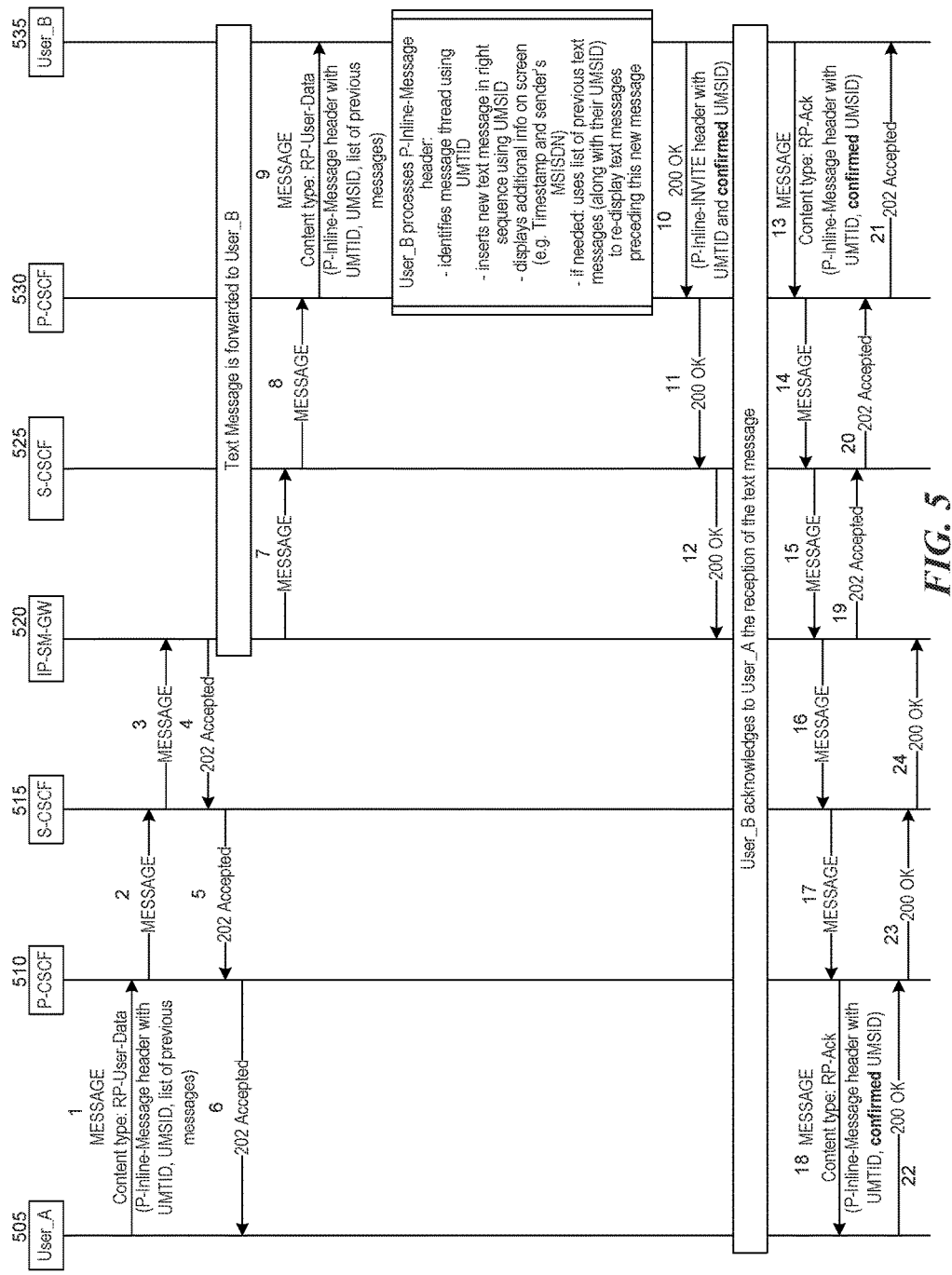
FIG. 5 is a sample call flow using SIP MESSAGE method in accordance with an embodiment herein.

FIG. 5 is a sample call flow using a SIP MESSAGE method in accordance with an embodiment herein. At step 1, User A 505 transmits MESSAGE towards P-CSCF 510. In an embodiment, the MESSAGE content type is RP-User-Data and includes P-Inline-Message header with UMTID and UMSID. In some embodiments, P-Inline-Message additionally includes a list of some or all previous messages in the messaging thread. At step 2, P-CSCF 510 transmits MESSAGE towards S-CSCF 515. At step 3, S-CSCF 515 transmits MESSAGE towards IP-SM-GW 520. At step 4, IP-SM-GW 520 transmits 202 Accepted towards S-CSCF 515. At step 5, S-CSCF 515 transmits 202 Accepted towards P-CSCF 510. At step 6, P-CSCF 510 transmits 202 Accepted towards User A 505. In steps 7-9, a text message is forwarded to User B as described in more detail herein. At step 7, IP-SM-GW 520 transmits MESSAGE towards S-CSCF 525. At step 8, S-CSCF 525 transmits MESSAGE towards P-CSCF 530. At step 9, P-CSCF 530 transmits MESSAGE towards User B 535. After receiving MESSAGE, User B processes the P-Inline-Message header. User B identifies the message thread using UMTID, inserts a new text message in the correct sequence using UMSID, and displays additional information on the user interface (e.g., timestamp and sending participant's MSISDN). In addition, if needed, User B uses a list of previous messages (along with their UMSID) to re-display messages preceding the current new message. At step 10, User B 535 transmits 200 OK towards P-CSCF 530. At step 11, P-CSCF 530 transmits 200 OK towards S-CSCF 525. At step 12, S-CSCF 525 transmits 200 OK towards IP-SM-GW 520.

At steps 13-18, User B acknowledges to User A the reception of the message, as described in more detail herein. User B returns a confirmed UMSID, which may be either the same UMSID that was received or a different UMSID to fix a collision case or in the case of deleted text messages. At step 13, User B 535 transmits MESSAGE towards P-CSCF 530. At step 14, P-CSCF 530 transmits MESSAGE towards S-CSCF 525. At step 15, S-CSCF 525 transmits MESSAGE towards IP-SM-GW 520. At step 16, IP-SM-GW 520 transmits MESSAGE towards S-CSCF 515. At step 17, S-CSCF 515 transmits MESSAGE towards P-CSCF 510. At step 18, P-CSCF 510 transmits MESSAGE towards User A 505. At step 19, IP-SM-GW 520 transmits 202 Accepted towards S-CSCF 525. At step 20, S-CSCF 525 transmits 202 Accepted towards P-CSCF 530. At step 21, P-CSCF 530 transmits 202 Accepted towards User B 535. At step 22, User A 505 transmits 200 OK towards P-CSCF 510. At step 23, P-CSCF 510 transmits 200 OK towards S-CSCF 515. At step 24, S-CSCF 515 transmits 200 OK towards IP-SM-GW 520. In some embodiments, some or all traversed nodes 510, 515, 520, 525, and/or 530 ignore the P-Inline-Message header.

Figure 6:
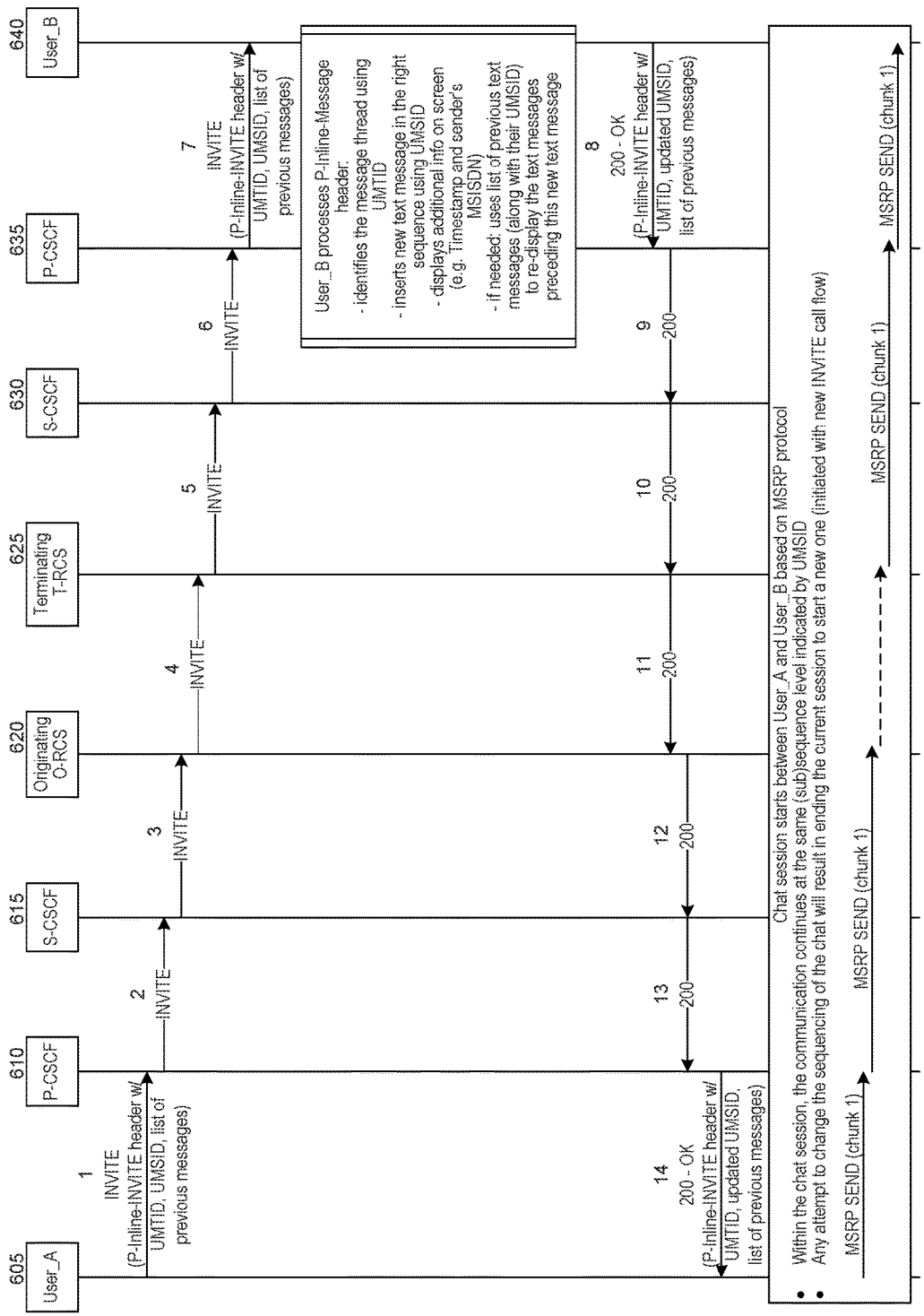
FIG. 6 is a sample call flow using SIP INVITE method in accordance with an embodiment herein.

FIG. 6 is a sample call flow using SIP INVITE method in accordance with an embodiment herein. At step 1, User A 605 transmits INVITE towards P-CSCF 610. At step 2, P-CSCF 610 transmits INVITE towards S-CSCF 615. At step 3, S-CSCF 615 transmits INVITE towards O-RCS 620. At step 4, O-RCS 620 transmits INVITE towards T-RCS 625. At step 5, T-RCS 625 transmits INVITE towards S-CSCF 630. At step 6, S-CSCF 630 transmits INVITE towards P-CSCF 635. At step 7, P-CSCF 635 transmits INVITE towards User B 640. After receiving INVITE, User B processes the P-Inline-Message header. User B identifies the message thread using UMTID, inserts a new text message in the correct sequence using UMSID, and displays additional information on the user interface (e.g., timestamp and sending participant's MSISDN). In addition, if needed, User B uses a list of previous messages (along with their UMSID) to re-display messages preceding the current new message. At step 8, User B 640 transmits 200 OK towards P-CSCF 635. At step 9, P-CSCF 635 transmits 200 OK towards S-CSCF 630. At step 10, S-CSCF 630 transmits 200 OK towards T-RCS 625. At step 11, T-RCS 625 transmits 200 OK towards O-RCS 620. At step 12, O-RCS 620 transmits 200 OK towards S-CSCF 615. At step 13, S-CSCF 615 transmits 200 OK towards P-CSCF 610. At step 14, P-CSCF 610 transmits 200 OK towards User A 605. In some embodiments, some or all traversed nodes 610, 615, 620, 625, 630 and/or 635 ignore the P-Inline-Message header. The chat session starts between User A and User B based on MSRP protocol. Within the chat session, the communication continues at the same sequence or subsequence level indicated by UMSID. Any attempt to change the sequencing of the chat will result in ending the current session to start a new one (initiated with new INVITE call flow).

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A computer-implemented method in a mobile device to exchange inline messages among multiple participants in a messaging thread via a telecommunications network, the method comprising:

presenting, via a user interface on a mobile device, a messaging thread comprising multiple messages,
wherein each message in the multiple messages is associated with a sequence number that is unique within the messaging session;

receiving, via the user interface, a selection of position located between a first message and a second message of the multiple messages;

generating a subsequence number based on the received selection, wherein the generated subsequence number has a child hierarchical relationship relative to the first message or the second message;

receiving a new message via the user interface;
associating the received new message with the generated subsequence number;

transmitting the new message, wherein the transmitting the new message includes transmitting the generated subsequence number, and
wherein the generated subsequence number enables the new message to be displayed between the first message and the second message on the user interface.

2. The computer-implemented method of claim 1, wherein the telecommunications network is an Internet Multimedia Subsystem (IMS) network.

3. The computer-implemented method of claim 1, wherein transmitting the new message includes transmitting an identification of a subsequence number associated with the new message.

4. The computer-implemented method of claim 1, wherein transmitting the new message includes transmitting an identification of a thread that is associated with the new message.

5. The computer-implemented method of claim 4, wherein the identification of a thread that is associated with the new message includes an identification of an originator of a message in the messaging thread and an indication of a date and time associated with the messaging thread.

6. The computer-implemented method of claim 1, wherein the user interface enables a selection to display the multiple messages in the messaging thread in a chronological order.

7. The computer-implemented method of claim 1, wherein the user interface enables a selection to display the multiple messages in the messaging thread in an order corresponding to the sequence number or subsequence number of each message in the messaging thread.

8. A non-transitory computer-readable medium storing instructions that, when executed by a processor in mobile telecommunications network, cause the network to execute a method in a mobile device to exchange inline messages among multiple participants in a messaging thread via a telecommunications network, the method comprising:
providing, for display via a user interface on a mobile device, a messaging thread comprising multiple messages, each message in the multiple messages being associated with a sequence number unique within the messaging session;
receiving a selection between a first message and a second message of the multiple messages,
wherein the selection is provided via the user interface;
generating a subsequence number based on the received selection, the generated subsequence number having a child hierarchical relationship relative to the first message or the second message;
receiving a new message via the user interface;
associating the received new message with the generated subsequence number;
transmitting the new message, wherein the transmitting the new message includes transmitting the generated subsequence number, and wherein the generated subsequence number enables the new message to be displayed between the first message and the second message on the user interface.

9. The non-transitory computer-readable medium of claim 8, wherein the telecommunications network is an Internet Multimedia Subsystem (IMS) network.

10. The non-transitory computer-readable medium of claim 8, wherein transmitting the new message includes transmitting an identification of a subsequence number associated with the new message.

11. The non-transitory computer-readable medium of claim 8, wherein transmitting the new message includes transmitting an identification of a thread that is associated with the new message.

12. The non-transitory computer-readable medium of claim 11, wherein the identification of a thread that is associated with the new message includes an identification of an originator of a message in the messaging thread and an indication of a date and time associated with the messaging thread.

13. The non-transitory computer-readable medium of claim 8, wherein the user interface enables a selection to display the multiple messages in the messaging thread in a chronological order.

14. The non-transitory computer-readable medium of claim 8, wherein the user interface enables a selection to display the multiple messages in the messaging thread in an order corresponding to the sequence number or subsequence number of each message in the messaging thread.

15. A system adapted to exchange inline messages among multiple participants in a messaging thread via a telecommunications network, the system comprising:
a memory;
a processor coupled to the memory, wherein the system is further configured to:
receive, via a user interface on a mobile device, a messaging thread comprising multiple messages, each message in the multiple messages being associated with a sequence number that is unique within the messaging session;
provide, via the user interface, a selection of an area located between a first message and a second message of the multiple messages;
receive a subsequence number based on the received selection, the subsequence number having a child hierarchical relationship relative to the first message or the second message;
provide a new message via the user interface,
wherein the received new message is associated with the generated subsequence number;
provide the new message, wherein the new message includes the generated subsequence number, and wherein the generated subsequence number enables the new message to be displayed between the first message and the second message on another user interface.

16. The system of claim 15, wherein the telecommunications network is an Internet Multimedia Subsystem (IMS) network.

17. The system of claim 15, wherein transmitting the new message includes transmitting an identification of a subsequence number associated with the new message and transmitting an identification of a thread that is associated with the new message.

18. The system of claim 17, wherein the identification of a thread that is associated with the new message includes an identification of an originator of a message in the messaging thread and an indication of a date and time associated with the messaging thread.

19. The system of claim 15, wherein the user interface enables a selection to display the multiple messages in the messaging thread in a chronological order.

20. The system of claim 15, wherein the user interface enables a selection to display the multiple messages in the messaging thread in an order corresponding to the sequence number or subsequence number of each message in the messaging thread.

\* \* \* \* \*